(12) United States Patent
Willems et al.

(10) Patent No.: US 10,315,139 B2
(45) Date of Patent: Jun. 11, 2019

(54) FUEL FILTER ASSEMBLY, FILTER ELEMENT AND METHOD FOR DRAINING WATER FROM A FUEL FILTER ASSEMBLY

(71) Applicant: Donaldson Company, Inc., Minneapolis, MN (US)

(72) Inventors: Gert Willems, Wilsele (BE); Daniel Fertil, Watermael Boitsfort (BE); Mauro Morandi, Brussels (BE)

(73) Assignee: Donaldson Company, Inc., Minneapolis, MN (US)

( * ) Notice: Subject to any disclaimer, the term of this patent is extended or adjusted under 35 U.S.C. 154(b) by 376 days.

(21) Appl. No.: 15/039,344

(22) PCT Filed: Nov. 26, 2014

(86) PCT No.: PCT/US2014/067652
§ 371 (c)(1),
(2) Date: May 25, 2016

(87) PCT Pub. No.: WO2015/081222
PCT Pub. Date: Jun. 4, 2015

(65) Prior Publication Data
US 2017/0021295 A1    Jan. 26, 2017

(30) Foreign Application Priority Data
Nov. 29, 2013 (EP) .................................. 13195161

(51) Int. Cl.
*B01D 35/00* (2006.01)
*B01D 36/00* (2006.01)
(Continued)

(52) U.S. Cl.
CPC ......... *B01D 36/006* (2013.01); *B01D 35/005* (2013.01); *B01D 36/005* (2013.01);
(Continued)

(58) Field of Classification Search
CPC ..... B01D 35/005; F02M 37/22; F02M 37/221
See application file for complete search history.

(56) References Cited

U.S. PATENT DOCUMENTS 4,242,115 A    12/1980    Harold et al.
4,537,608 A    8/1985    Koslow
(Continued)

FOREIGN PATENT DOCUMENTS

DE    202006019301 U1    4/2008
DE    102013100415 A1    7/2013
(Continued)

OTHER PUBLICATIONS

International Search Report and Written Opinion for PCT/US2014/067652, dated Apr. 10, 2015.
(Continued)

*Primary Examiner* — Ellen M McAvoy
(74) *Attorney, Agent, or Firm* — Merchant & Gould P.C.

(57) ABSTRACT

The disclosure relates to a fuel filter assembly, a filter element, and a method of draining water from a fuel filter assembly. The fuel filter assembly comprises a filter element with a water collecting space; the filter element being connected to a fuel pipe for feeding an upstream side of the filter element with fuel and for providing filtered fuel from a downstream side of the filter element to a combustion engine or parts thereof; a fuel pump arranged downstream from the filter element, wherein the fuel pump can be operated in a first mode for drawing fuel through the filter element and in a second, reverse mode for feeding fuel back to the filter element; a one-way fuel valve arranged upstream of the filter element allowing for flow towards the upstream side of the filter element; a pressure-actuated one-way drain valve in communication with the water collecting space.

22 Claims, 11 Drawing Sheets

Figure 1:
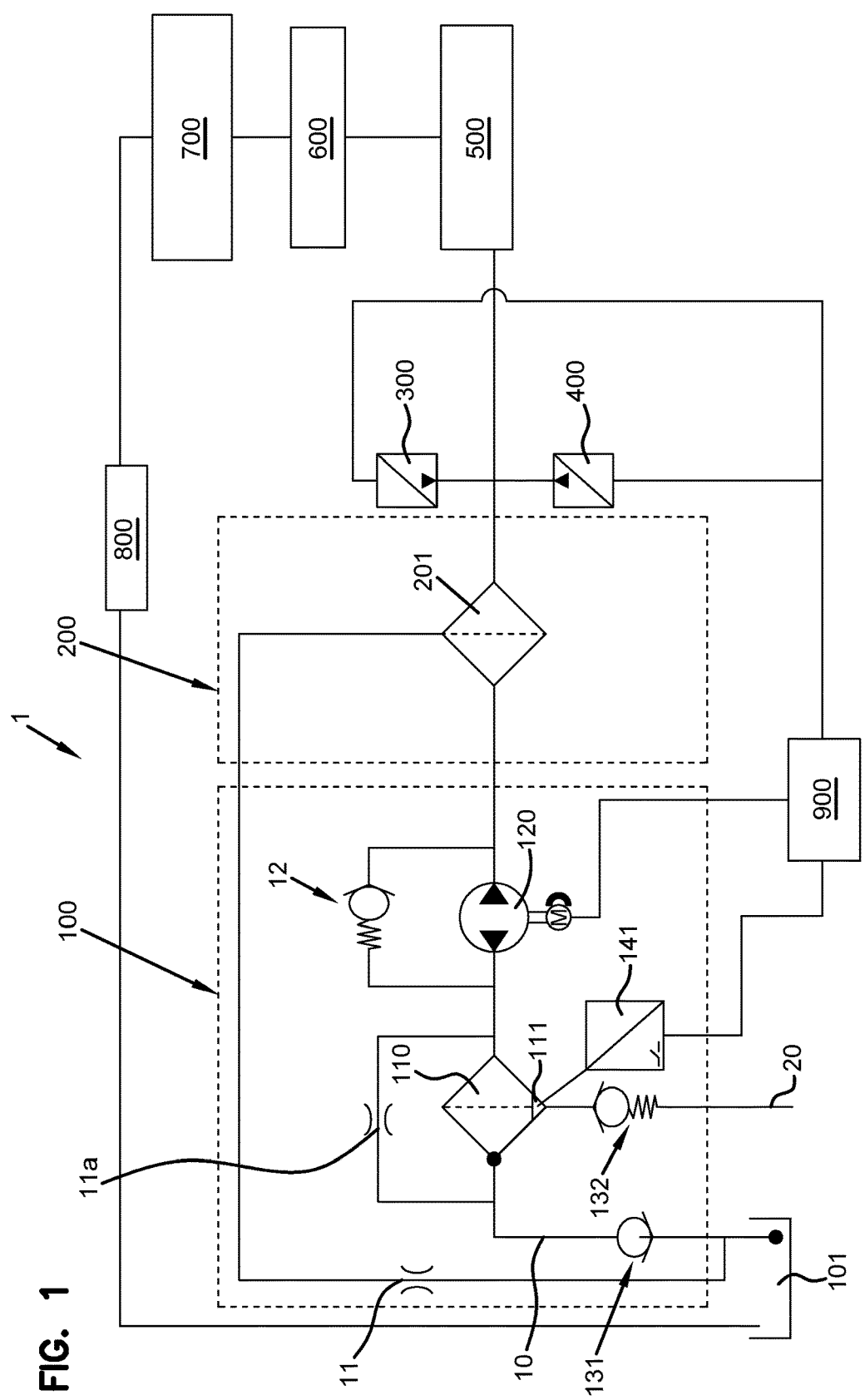

(51) Int. Cl.
 *F02M 37/24* (2019.01)
 *B01D 37/04* (2006.01)
 *F02M 37/28* (2019.01)

(52) U.S. Cl.
 CPC ......... *B01D 36/008* (2013.01); *B01D 37/041* (2013.01); *B01D 37/046* (2013.01); *B01D 37/048* (2013.01); *F02M 37/24* (2019.01); *F02M 37/28* (2019.01)

(56) References Cited

U.S. PATENT DOCUMENTS

| | | | |
|---|---|---|---|
| 7,850,846 B2 * | 12/2010 | De La Azuela | B01D 36/008 210/114 |
| 9,440,168 B2 * | 9/2016 | Eberle | B01D 35/153 |
| 9,718,005 B2 * | 8/2017 | Klein | F02M 37/221 |
| 9,751,031 B2 * | 9/2017 | Eberle | B01D 29/58 |
| 10,010,815 B2 * | 7/2018 | Sturgess | B01D 35/18 |
| 2010/0096304 A1 * | 4/2010 | Ganswein | B01D 36/008 210/86 |
| 2010/0101984 A1 | 4/2010 | Roesgen et al. | |
| 2014/0284263 A1 * | 9/2014 | Duerr | B01D 29/21 210/437 |
| 2015/0041415 A1 * | 2/2015 | Cope | F02M 37/0064 210/805 |
| 2016/0040638 A1 * | 2/2016 | Ogawa | F02M 37/22 210/85 |
| 2016/0108871 A1 * | 4/2016 | Ganswein | F02M 37/0035 123/495 |
| 2016/0222931 A1 * | 8/2016 | Jiang | B01D 35/153 |

FOREIGN PATENT DOCUMENTS

| | | |
|---|---|---|
| WO | 2009/153584 A1 | 12/2009 |
| WO | 2013/019643 A2 | 2/2013 |

OTHER PUBLICATIONS

Extended European Search Report for EP 13195161.8, dated Apr. 1, 2014.

* cited by examiner

FUEL FILTER ASSEMBLY, FILTER ELEMENT AND METHOD FOR DRAINING WATER FROM A FUEL FILTER ASSEMBLY

This application is a National Stage of PCT International application No. PCT/US2014/067652, filed Nov. 26, 2014, which claims priority to European patent application No. EP13195161.8, filed Nov. 29, 2013, which applications are incorporated herein by reference. To the extent appropriate, a claim of priority is made to each of the above disclosed applications.

The disclosure relates to a fuel filter assembly, comprising a filter element with a water collecting space; the filter element being connected to a fuel pipe for feeding an upstream side of the filter element with fuel and for providing filtered fuel from a downstream side of the filter element. The disclosure further relates to a filter element, in particular a filter element for such a fuel filter assembly. Further, the disclosure relates to a method of draining water from a fuel filter assembly.

A filter element in a fuel filter assembly serves in particular to separate water from the fuel since downstream machinery, such as a combustion engine or parts thereof may be damaged and/or deteriorated when provided with fuel containing water. Besides separating water from the fuel, the filter element may also separate particles from the fuel. The filter element therefore comprises filter media for separating or filtering water, and possibly particles, from the fuel. The filter element usually needs to be replaced during the lifespan of a fuel filter assembly. Filter cartridges containing a filter element therefore are also supplied as replacement cartridges.

Water separated from the fuel in the filter element of a fuel filter assembly is collected in a water collecting space, sometimes also described as water collection chamber, drain volume or drain bowl. The water collecting space usually is located in a lower volume of the filter element. Based on the difference in density of fuel versus water, the water accumulates in the lower part of the water collecting space and fuel which may be present in the water collecting space will usually accumulate on top of or in an upper region of the accumulated water.

Water accumulated in the water collecting space may be drained by a manual drainage valve, for example a manually operated twist and drain system. In such systems, a drain pipe draining the water from the water collecting space, usually by gravity, is manually opened. Since the water collected in the water collecting space usually is still contaminated, in particular with hydrocarbon, the water drained from the water collecting space needs to be disposed in an appropriate way and may not be disposed directly to the environment. However, fully automated systems are desirable where the water can be drained in an environmental friendly way without intervention of a user or driver.

From DE 10 2006 039 581 A1 and US 2010/0096304 A1 a fuel filter with a filter element and a dewatering device with a hydrocarbon adsorber is known. In this fuel filter, a first valve is arranged between a water collecting space and the dewatering device and an optional second valve is arranged downstream from the hydrocarbon adsorber of the dewatering device. Both valves are switchable either manually, periodically or as a function of the degree of filling of the water collecting space (first valve) or as a function of the first valve (second valve). Preferably, two solenoid valves in series are used which are connected to an electronic control unit. However, this system is bulky and expensive.

Further, from EP 1 669 590 B1 an automated drain system is known using a ceramic membrane to clean the separated water from remaining fuel and/or hydrocarbon. However, expensive and complicated valves and pumps are required to run such a system.

It is therefore an object to provide for a fuel filter assembly, a filter element and/or a method for draining a fuel filter assembly that will overcome or reduce at least one of the above mentioned disadvantages. In particular, it is an object to provide a fuel filter assembly, a filter element and/or a method for draining a fuel filter assembly which can be provided with lower cost and/or less complexity and/or high reliability.

According to a first aspect, the invention is solved by a fuel filter assembly, comprising a filter element with a water collecting space and a water drain outlet; the filter element being connected to a fuel pipe for feeding an upstream side of the filter element with fuel and for providing filtered fuel from a downstream side of the filter element; a fuel pump arranged downstream from the filter element, wherein the fuel pump can be operated in a first mode for drawing fuel through the filter element and in a second, reverse mode for feeding fuel back to the filter element; a one-way fuel valve arranged upstream of the filter element allowing for flow towards the upstream side of the filter element; a pressure-actuated one-way drain valve in communication with the water collecting space and the water drain outlet.

The fuel filter assembly comprises a filter element with filter media for separating or filtering water, and possibly particles, from fuel and a water collecting space for collecting water separated from the fuel. The filter media for the present filter element can be any filter media suitable for separating or filtering water, and possibly particles, from fuel, for example an impact filter, a centrifugal filter, filter media, a hydrophobic screen, a separation membrane, or a water coalescing device. Preferably, the filter element has a fuel inlet for unfiltered fuel and a fuel outlet for filtered fuel. The fuel inlet and/or the fuel outlet can be openings in a filter housing, for example. Generally, the fuel inlet and/or the fuel outlet can be a defined or limited inlet and/or outlet space in communication with an upstream or the downstream side of the filter element, respectively.

The connection of the filter element to a fuel pipe allows to provide fuel, for example from a fuel tank, to the upstream side of the filter element and, after filtration, provide filtered fuel from the downstream side of the filter element to a combustion engine or parts thereof. Usually, this filtering stage is referred to as the primary filtering stage and the filter element can also be referred to as the primary filter element. Optionally, downstream of the primary filter stage a secondary filter stage with a secondary filter element can be provided. The fuel filtered in the primary filter stage therefore can be directed to downstream machinery, such as a combustion engine or parts thereof, in particular to a high pressure fuel system, directly or via a secondary filter stage, for example.

The fuel pump arranged downstream from the filter element is, under normal operating conditions, operated in a first mode. In this first mode, the fuel pump draws fuel from the fuel tank through the filter element, which usually results in a negative pressure upstream of the fuel pump to create the suction function. Further, in the first mode the fuel pump creates pressure in the fuel pipe downstream of the fuel pump, thereby pushing the fuel, preferably through an optional secondary filter stage. Usually, when used with a combustion engine, the combustion engine is not running, also the fuel pump is not operating.

In general, and unless stated otherwise, descriptions in the present disclosure relating to the direction of flow, in particular descriptions of upstream or downstream, relate to the fuel flow direction in this first mode of operation of the fuel pump. Descriptions related to the flow direction of water from the water collecting space, however, refer to the flow of water from the water collecting space occurring during the reverse mode of the fuel pump.

According to the present fuel filter assembly, the fuel pump can be operated in a second mode, which is reverse to the first mode for feeding fuel back to the filter element. The second, reverse mode therefore reverses the direction of flow of fuel through the fuel pipe and the filter element. The second, reverse mode is applicable when the combustion engine is turned off.

Optionally the fuel pump can be speed controlled (variable flow rate) to allow different flow rates in the first mode and a preferably lower flow rate in the second mode. The variable flow rate in the first mode serves to deliver the right amount of fuel to the high pressure system based on system requirements, such as engine running conditions. The typically lower flow rate in the reverse mode serves to control more precisely the volume of water to be drained in the second mode.

The fuel pump preferably is an electric pump. Further, the fuel pump is preferably a volumetric pump. For example, by controlling the duration of the operation of the pump in the second, reverse mode, the displacement volume can be easily managed and adapted to the desired volume of water to be drained from the water collecting space. For example, the fuel pump can be operated for a specific amount of time, for example 5, 10, or 15 seconds for each drainage or purge cycle.

Upstream from the filter element, i.e. between a fuel reservoir or fuel tank and the upstream side of the filter element, a one-way fuel valve is arranged in the fuel pipe. This one-way fuel valve allows for fuel flow from a fuel reservoir or fuel tank towards the upstream side of the filter element, but blocks fuel flow in the reverse direction. This one-way fuel valve preferably is a self-actuated valve, which does not depend on any external signal for opening in its one-way flow direction. Therefore, once the fuel pump operates in the second, reverse mode to feed fuel back into the filter element and back into the fuel pipe in the direction towards a fuel reservoir or fuel tank, the fuel valve will block fuel flow in this direction. This results in a rising pressure within the fuel pipe between the fuel valve and the fuel pump and thus also within the filter element and the water collecting space when the fuel pump is operated in the second, reverse mode.

In fluid communication with the water collecting space and the water drain outlet is a pressure-actuated one-way drain valve allowing for drainage of water from the water collecting space in case a pressure difference across the drain valve exceeds a predetermined value. This drain valve can, for example, be arranged in a drain pipe connected to the water collecting space. The drain valve is arranged between the water collecting space and the water drain outlet. By default, the drain valve is closed. The pressure-actuated one-way drain valve allows for flow of water or fluid out of the water collecting space of the filter element when it is pressure-activated, but blocks flow of water or fluid in the reverse direction, i.e. into the water collecting space, in any case. This one-way drain valve is pressure-actuated such that it opens in its one-way flow direction only when a certain pressure difference across the drain valve is reached or exceeded. This predetermined value can be also referred to as cracking pressure of the pressure-actuated drain valve. Preferably, the drain valve is self-actuated, i.e. does not depend on any external signal for pressure control. Rather, preferably the pressure in the fuel line, filter element and/or water collecting space itself is used as an actuating means to open or close the drain valve. The drain valve is configured such that it opens when the pressure in the fuel pipe, the filter element and/or the water collecting space, i.e. the pressure upstream of the drain valve (upstream/downstream with respect to the drain valve related to the water flow direction), exceeds the pressure at the downstream side of the drain valve, for example the pressure in the environment, by a predetermined value. It may even be sufficient that the drain valve opens in case the pressure on the upstream side of the drain valve equals the pressure on the downstream side since during regular operation, i.e. operating the fuel pump in the first mode, the pressure on the upstream side of the drain valve is lower than the pressure on the downstream side of the drain valve. Preferably, the drain valve is a spring-loaded release valve.

By using one one-way fuel valve upstream of a filter element and a pressure-actuated one-way drain valve in communication with the water collecting space, the second, reverse mode of the fuel pump will create an overpressure in the water collecting space of the filter element which will open the pressure-actuated one-way drain valve and will discharge the separated water, preferably only the separated water, from the water collecting space.

The overpressure generated from the reverse operation of the fuel pump in the second, reverse mode can, for example, range from 100-400 kPa (1-4 Bar) to open the pressure-actuated one-way drain valve.

A preferred basic operating mode may be as follows: While a combustion engine is running, the fuel pump is operating in the first mode and is acting as a transfer pump and creating a slight underpressure in the water collecting space resulting in keeping the pressure-actuated one-way drain valve in closed condition. The water separated from the fuel in the filter element is collected in the water collecting space. When a combustion engine is turned off, no more fuel needs to be fed to the high pressure fuel systems of the combustion engine. Therefore, the fuel pump can be reverted in direction and be operated in the second, reverse mode and thus will create a pressure in the water collecting space, resulting in opening the pressure-actuated one-way drain valve.

The fuel filter assembly according to the present disclosure has a number of advantages. For example, by using the same fuel pump used during the operation of the combustion engine for initiating drainage when the combustion engine is turned off by operating the fuel pump in a second, reverse mode, saves cost, space and complexity required for providing for an additional pump.

Further, according to the fuel filter assembly described herein, drainage of separated water from the water collecting space is managed by means of pressure control initiated by the respective operating modes of the fuel pump only instead of complicated and expensive individual powered valve systems.

Preferably, a standard one-way valve is used as fuel valve. Further preferably a simple spring-loaded valve or spring-loaded release valve is used as pressure-actuated one-way drain valve, which means that the fuel filter assembly is much cheaper compared to solenoid valve controlled systems. Due to the very lost cost of pressure-actuated one-way drain valves, in particular spring-loaded valves or spring-loaded release valves, the pressure-actuated one-way drain valve can be built into a filter cartridge comprising the filter element and be supplied as a replacement cartridge. Replacement filter cartridges, for example, can be provided as spin-on filter cartridges.

A further advantage is that the pressure built-up in the water collecting space and in an optional drain line preferably connected to the water collecting space by the fuel pump operating in the second, reverse mode can be used to push the separated, discharged water into a separate container, which for example is arranged at a distance or higher than the water collecting space.

A further advantage of the fuel filter assembly is that it is simple and reliable system, since drainage is only possible when the combustion engine is not running, which is particularly advantageous and safe for on-road applications, and the fuel pump is running in a second, reverse mode. Therefore, valves cannot be opened accidentally which could result in high volume of fuel spilling.

Preferably, the fuel filter assembly further comprises a manual drainage valve in communication with the water collecting space. Such a possibility for manual draining is preferably provided to empty the filter element prior to replacing the filter element or filter cartridge. Without such manual draining fuel may be spilled when replacing the filter element or filter cartridge. Preferably, the manual drainage valve is removably connected to the filter element.

In a further preferred embodiment, the fuel filter assembly further comprises a water purification space with a hydrocarbon remover. The water purification space is preferably arranged downstream (in the direction of water flow) from the water collecting space such that the pressure-actuated one-way drain valve is arranged between the water collecting space and the water purification space and allows for water flow from the water collecting space to the water purification space. The water purification space preferably is contained in a water purification chamber.

The water collecting space and the water purification space may be connected via a drain pipe in which the pressure-actuated one-way drain valve is positioned. The hydrocarbon remover preferably contains or consists of an adsorber, like activated carbon, a separator, or a chemical treatment agent to decompose hydrocarbon, for example. Preferably, the water purification space with the hydrocarbon remover is adapted and dimensioned to reduce the amount of hydrocarbon contained in the water significantly, preferably from an amount of hydrocarbon in the water of about 200 ppm to an amount of hydrocarbon below regulatory thresholds, for example below 10 ppm.

Further, it is preferred that a pressure-actuated one-way discharge valve is provided in communication with the water purification space. The pressure-actuated one-way discharge valve allows for discharge of water from the water purification space, preferably through a drain pipe, in case a pressure difference across the discharge valve exceeds a predetermined value. This predetermined value can also be referred to as the cracking pressure of the discharge valve. The pressure-actuated one-way discharge valve preferably is a spring-loaded valve or spring-loaded release valve.

Preferably, the water purification space, and possibly the pressure-actuated one-way discharge valve, are part of the filter element or a replacement cartridge. In particular, the pressure-actuated one-way valves used as the drain valve and the discharge valve as well as the water purification space with the hydrocarbon remover can be easily integrated into the filter element or into a filter cartridge together with the filter element and thus form a replacement element, replacement cartridge or replacement unit. This allows for a very compact design. Alternatively, the water purification space with a hydrocarbon remover can be provided as a separate, preferably also replaceable, element that can be connected, preferably directly, to the water collection space of the filter element.

Providing for a water purification space with a hydrocarbon remover allows for purification of the water and thus the discharge of the water from the water purification space directly to the environment or another system and reduces or eliminates the need for a special handling of the discharged water.

It is further preferred that an inner volume of the water purification space has at least the same volume as an inner volume of the water collection space or a maximum fill level of the water collecting space, respectively. Preferably, the inner volume of the water purification space is larger than the inner volume of the water collecting space by at least 5%, 10%, 15%, 20%, 25%, 30%, 50%, 75%, 100%, 125%, 150%, or 200%. By using a water purification space with an inner volume in any of these preferred dimensions has the advantage that the residence time of water in the water purification space usually will be longer than the time between several engine stops (in range of hours to days). This allows the hydrocarbon remover to remove a maximized amount of hydrocarbon from the water.

Further, it is preferred to provide a bypass, preferably in the form of an air bleed or orifice, in the fuel pipe bridging the filter element, the fuel valve and the fuel pump. Such a bypass can facilitate and/or accelerate a pressure equilibrium on both sides of the filter element during operation of the fuel pump in the second, reverse mode. The bypass may also help to avoid collapsing of filter media in the filter element during reverse operation of the fuel pump in case a filter element with filter media is used. Further, the bypass allows to draw a volume of fuel needed in the reverse action to built up pressure upstream of the fuel pump from the fuel pipe or fuel reservoir.

In a preferred embodiment, a drain pipe connected to the water collector and comprising the pressure-actuated one-way drain valve is provided, which is adapted and arranged to drain water and/or fuel from the water collection space in the filter element to a separate volume in a fuel tank. This embodiment has the advantage that drainage can be initiated on a regular basis even if no or little water is accumulated in the water collecting space and, for example, no water level sensor is necessary to initiate the reverse operation of the fuel pump for drainage. Since the liquid drained from the water collecting space is directed to the separate volume in a fuel tank, also fuel can be discharged in this way. Further, this embodiment has the advantage that also a water purification space is not necessary, since the water is not discharged to the environment or to any other system sensible to hydrocarbon contamination.

In a further preferred embodiment, a water level sensor is provided for detecting whether water accumulated in the water collecting space exceeds a predetermined level. The water level sensor may be adapted and arranged to be a single level sensor, a two-level sensor or a multiple-level sensor. Further, two or more water level sensors may be provided.

Further, it is preferred that the water level sensor is removably attached to the filter element, in particular to a replacement filter element or a replacement filter cartridge. Since water level sensors can be expensive, it is preferred to re-use the water level sensors even when the filter element or filter cartridge is replaced. Therefore, the water level sensor is preferably removable from the filter element or filter cartridge before the filter element or filter cartridge is disposed and then reused with a new filter element or filter cartridge. It is particularly preferred to arrange the water level sensor on the manual drainage valve, which is also preferably not discharged with a replacement filter element or filter cartridge but reused with a new replacement filter element or filter cartridge.

Preferably, the water level sensor is connected to the fuel pump such that the fuel pump can be started and/or stopped to operate in the second, reverse mode depending on a signal from the water level sensor. The water level sensor may be connected to the fuel pump preferably via a control unit. The operating mode of this embodiment preferably is as follows: When the engine is turned off, and the water level sensor indicates that sufficient water volume is collected in the water collecting space of the filter element, the fuel pump will receive a respective signal from the water level sensor and, depending on this signal, start to operate in the second, reverse mode. The duration of the operation of the fuel pump in the second, reverse mode may be predetermined, for example 5, 10, or 15 s. Alternatively, the duration of the operation of the fuel pump in the second, reverse mode may depend on a further signal from the water level sensor, in particular a signal that the water level in the water collection space has dropped below a predetermined level and, depending on this signal, the operation of the fuel pump in the second, reverse mode is stopped.

When the fuel pump is provided as a volumetric pump, the displacement volume can be easily managed and hence only a single water level sensor is required to avoid the discharge of fuel from the water collecting space. It is preferred to adopt the duration of operation of the fuel pump in the second, reverse mode such that the displacement volume is equal to or smaller than the volume of water accumulated in the water collection space when the water level sensor initiates the start of the fuel pump operating in the second, reverse mode.

In general, it is preferred to keep record of the number of drainage cycles performed, for example in a control unit. The number of draining cycles or purges may be used to inform a user to replace the filter element and/or the water purification space in case the number of drainage cycles indicates that lifetime of the filter element has elapsed and/or that the hydrocarbon remover needs to be serviced or replaced, in case the adsorber is saturated, for example.

In a further embodiment it is preferred to provide a pressure sensor adapted and arranged to determine the pressure in the water purification space and/or to determine whether this pressure in the water purification space exceeds a predetermined value. When the pressure in the water purification space gets too high, this may be an indication for a frozen or blocked drain pipe or other damages or malfunctions of the system.

Further, it is preferred that a fuel sensor and/or an optical sensor is provided which is adapted and arranged to determine the presence and/or an amount of fuel and/or other impurities in the water accumulated in the water purification space and/or to determine whether an amount of fuel and/or other impurities in the water accumulated in the water purification space exceeds a predetermined value. The presence of fuel and/or other impurities in the water purification space may also be an indicator for a malfunction of the system or the end of the lifespan of the water purification space and in particular of the hydrocarbon remover contained therein.

Further, it is preferred to provide a temperature sensor adapted and arranged to determine a temperature, preferably a temperature in the water purification space, and/or to determine whether the determined temperature is below a predetermined value. The temperature sensor may therefore be used to detect whether temperatures are below freezing point and therefore the drain pipe or other water handling elements may be frozen.

The pressure sensor and/or the fuel sensor and/or the optical sensor and/or the temperature sensor are preferably removably attached to the filter element and are preferably reused even if the filter element or filter cartridge is replaced. Further, it is preferred that the pressure sensor and/or the fuel sensor and/or the optical sensor and/or the temperature sensor are provided at the manual drainage valve which also preferably is reused in case the filter cartridge or the filter element is replaced.

According to a further aspect, it is provided a filter element, comprising a filter media construction having filter media for separating water from fuel; a water collecting space and a water drain outlet; and a pressure-actuated one-way drain valve in communication with the water collecting space and the water drain outlet. The filter element is preferably a filter element for a fuel filter assembly or any of its embodiments as described above.

The filter media for the present filter element can be any filter media suitable for separating or filtering water, and possibly particles, from fuel, for example an impact filter, a centrifugal filter, filter media, a hydrophobic screen, a separation membrane, or a water coalescing device. Preferably, the filter element has a fuel inlet for unfiltered fuel and a fuel outlet for filtered fuel. The fuel inlet and/or the fuel outlet can be openings in a filter housing, for example. Generally, the fuel inlet and/or the fuel outlet can be a defined or limited inlet and/or outlet space in communication with an upstream or the downstream side of the filter element, respectively.

It is preferred that the filter element further comprises a manual drainage valve in communication with the water collecting space. Further, it is preferred that the filter element further comprises a water purification space with a hydrocarbon remover. Preferably, a pressure-actuated one-way discharge valve is provided in communication with the water purification space, allowing for drainage of water from the water purification space in case a pressure difference across the discharge valve exceeds a predetermined value.

Preferably, the filter element further comprises a water level sensor for detecting whether water accumulated in the water collecting space exceeds a predetermined level.

Preferably, the filter element further comprises a pressure sensor adapted and arranged to determine the pressure in the water purification space and/or to determine whether the pressure in the water purification space exceeds a predetermined value.

Preferably, the filter element further comprises a fuel sensor and/or an optical sensor adapted and arranged to determine the presence and/or an amount of fuel and/or other impurities in the water of the water purification space and/or to determine whether an amount of fuel and/or other impurities in the water of the water purification space exceeds a predetermined value.

Preferably, the filter element further comprises a temperature sensor adapted and arranged to determine a temperature and/or to determine whether the determined temperature is below a predetermined value.

As to the advantages, preferred embodiments and details of the filter element and its preferred embodiments, reference is made to the corresponding aspects and embodiments described above with reference to the fuel filter assembly.

According to a further aspect of the invention, a method for draining water from a fuel filter assembly is provided comprising the steps: providing a fuel filter assembly according to at least one of the previous claims; operating the fuel pump in the second, reverse mode, thereby raising the pressure in the filter element and/or the water collecting space and opening the drain valve once the pressure in the filter element and/or the water collecting space exceeds a predetermined value.

Further, it is preferred to wait for a predetermined period of time, for example 5, 10, or 15 minutes, after stopping operation in the first mode, before operating the fuel pump in the second, reverse mode. This has the advantage that the water in the water collecting space can settle and fuel remaining in the water collecting space can accumulate at the top of or in the upper region of the water. A further advantage, when used with combustion engines, is that no drainage is started when the combustion engine is stopped accidentally or only for a short time, for example in a start-stop automatic.

Further preferred steps are: directing the water from the drain valve to a water purification space with a hydrocarbon remover; and preferably discharging the water from the water purification space via a pressure-actuated one-way discharge valve in communication with the water purification space.

As to the advantages, preferred embodiments and details of the method and its preferred embodiments, reference is made to the corresponding aspects and embodiments described above with reference to the fuel filter assembly and the filter element.

The fuel filter assembly, filter element and method for draining a fuel filter assembly described herein can be used with any kind of fuel, for example with diesel fuel.

Examples of preferred embodiments shall now be described with reference to the attached drawings, in which.

Figure 2:
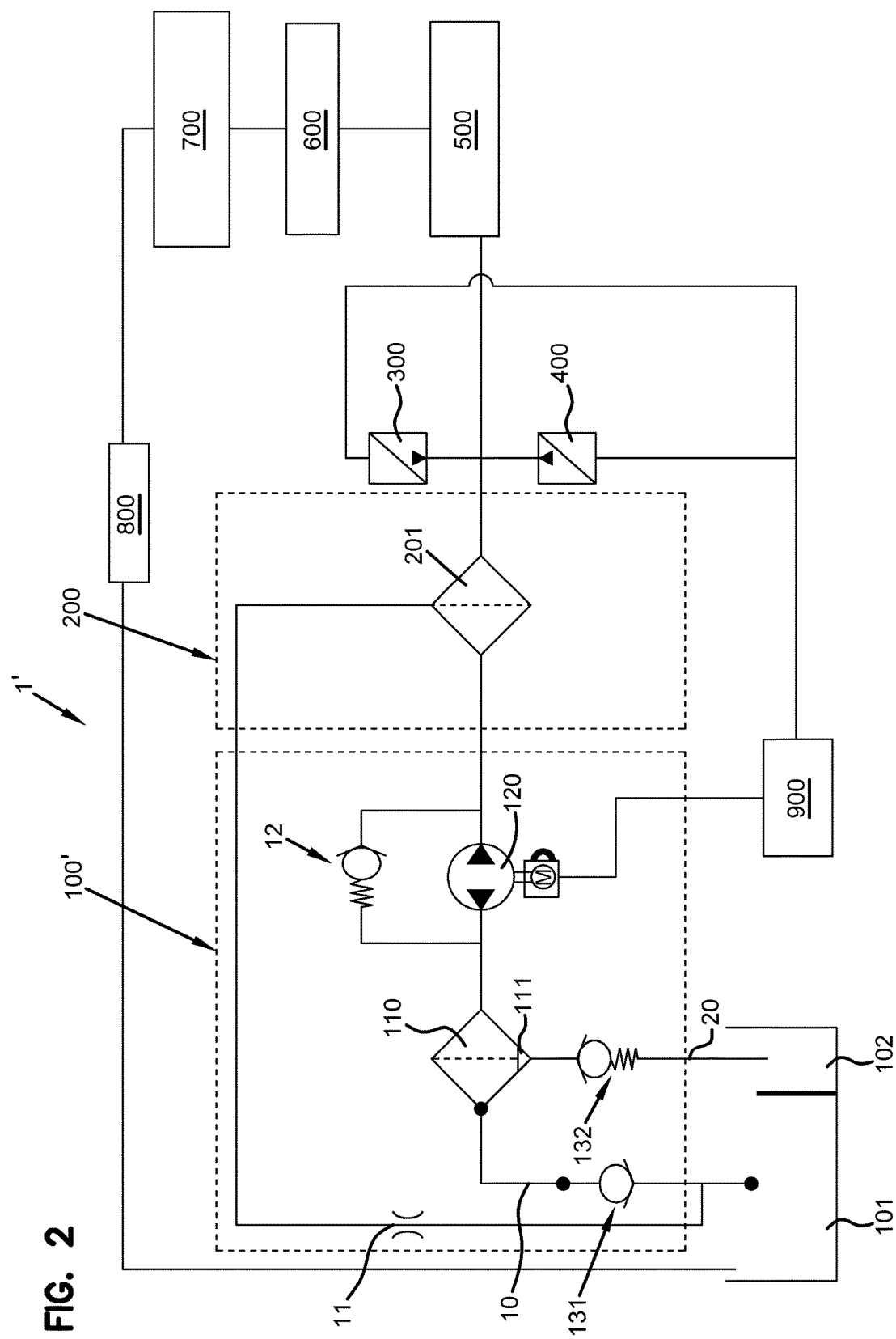
Figure 3:
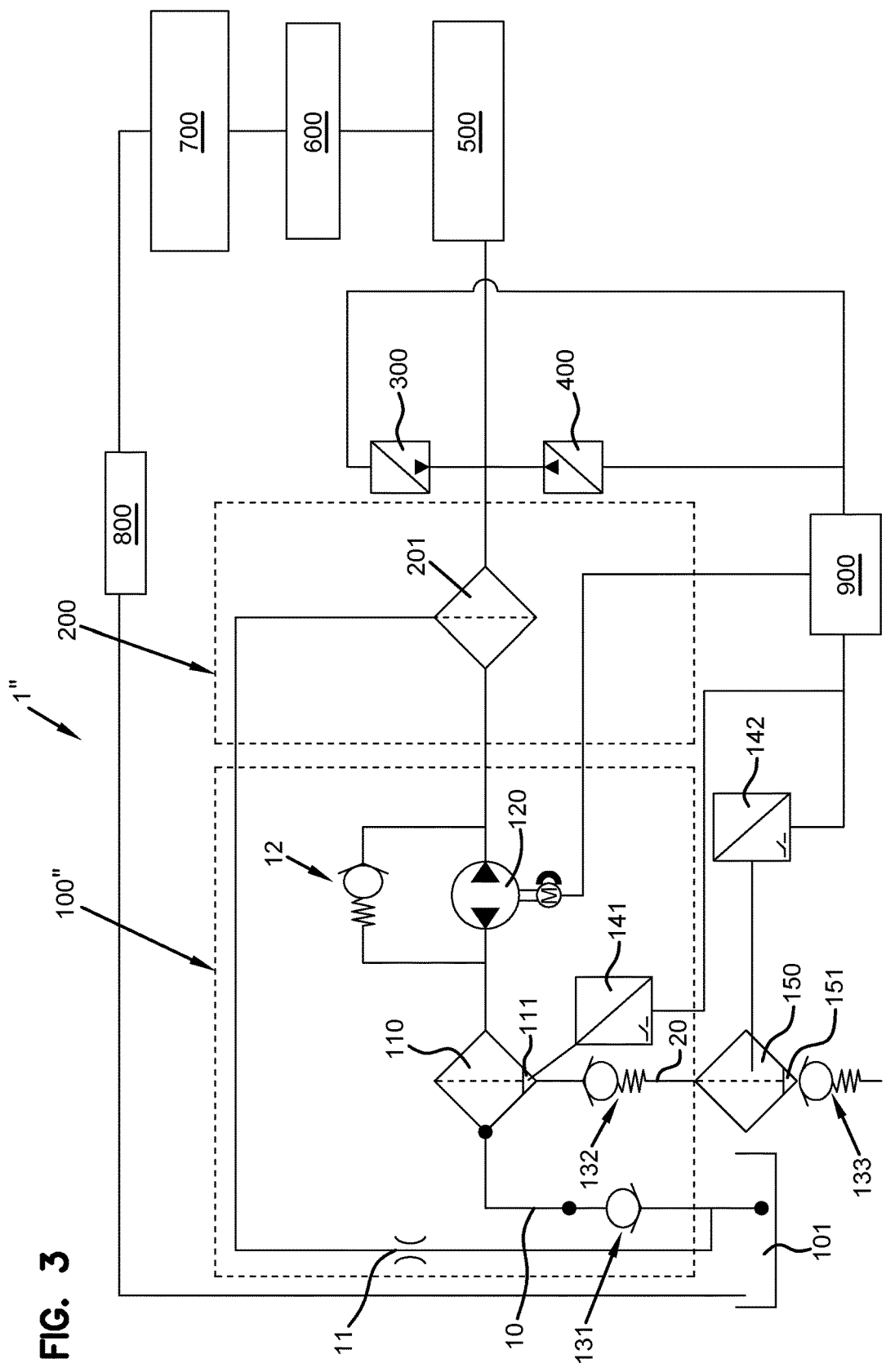
Figure 4:
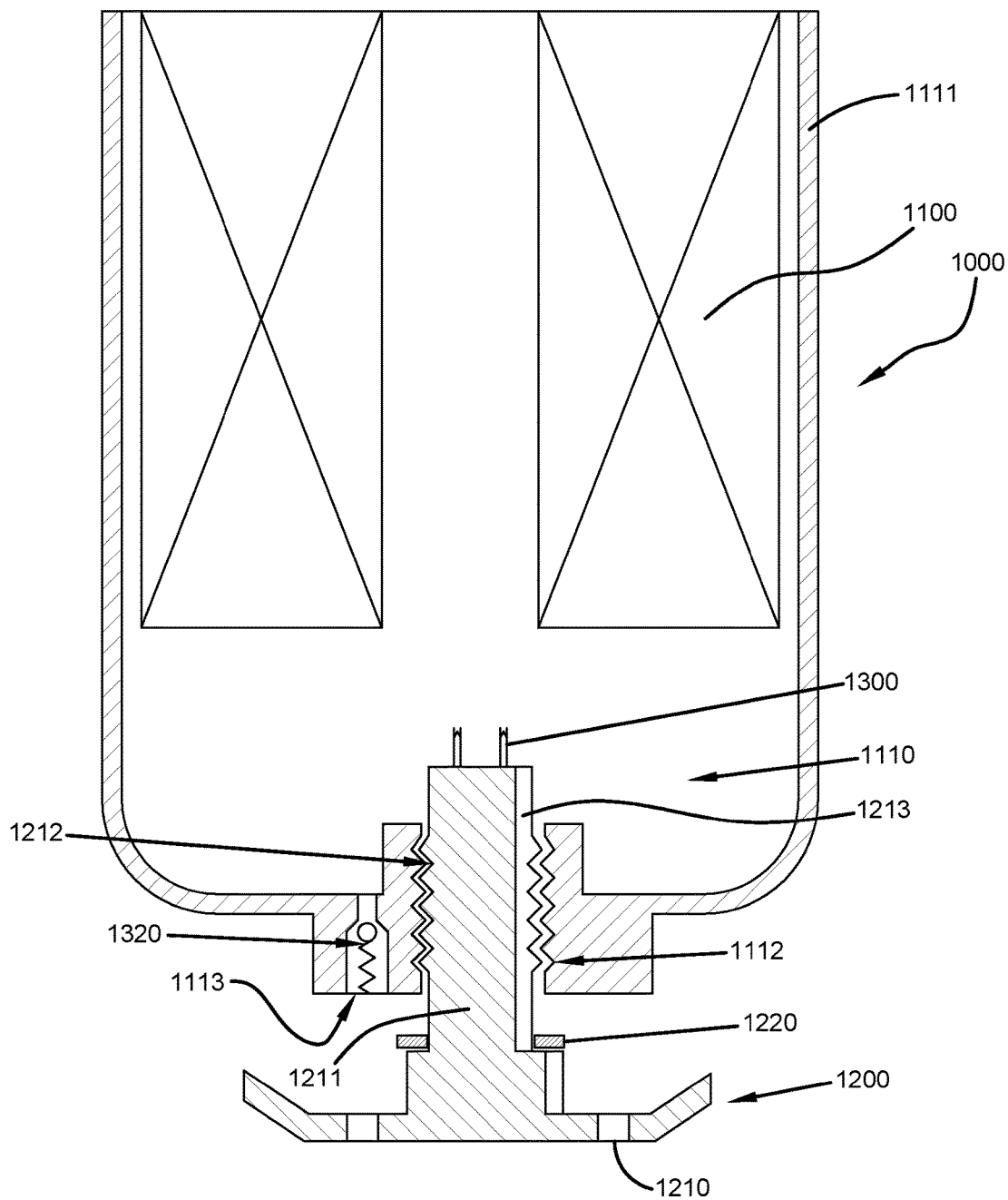
Figure 5:
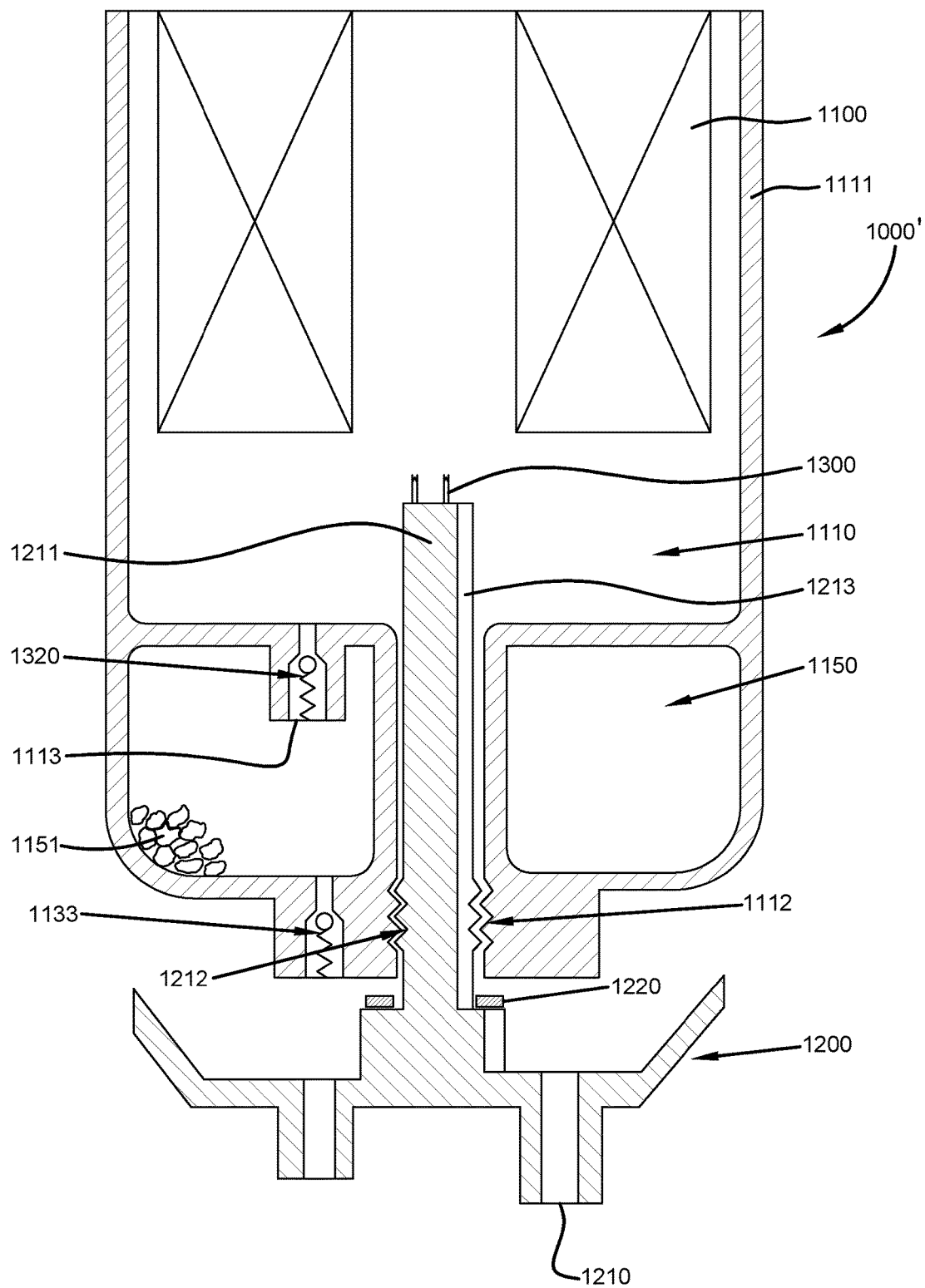
Figure 6:
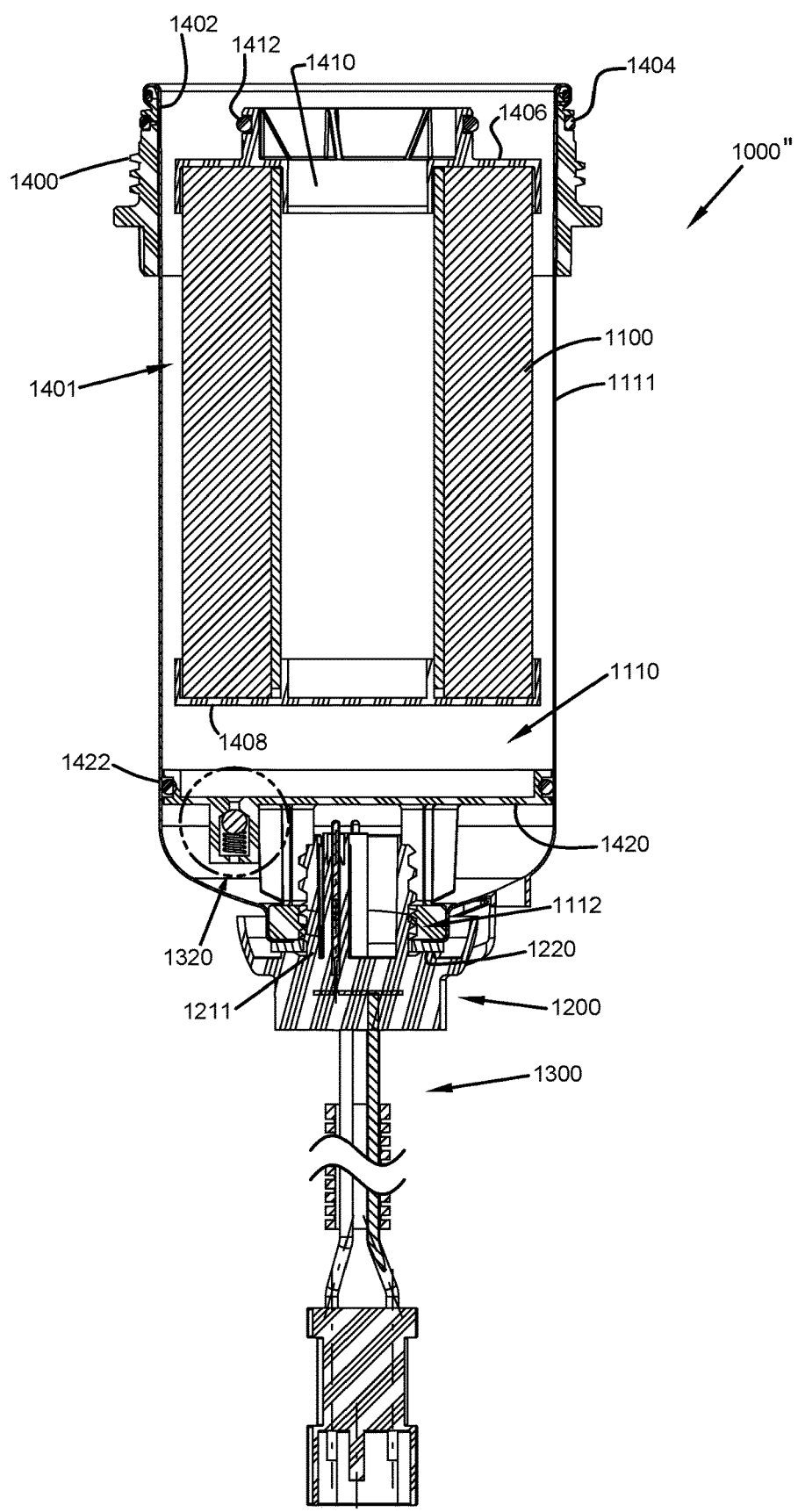
Figure 7:
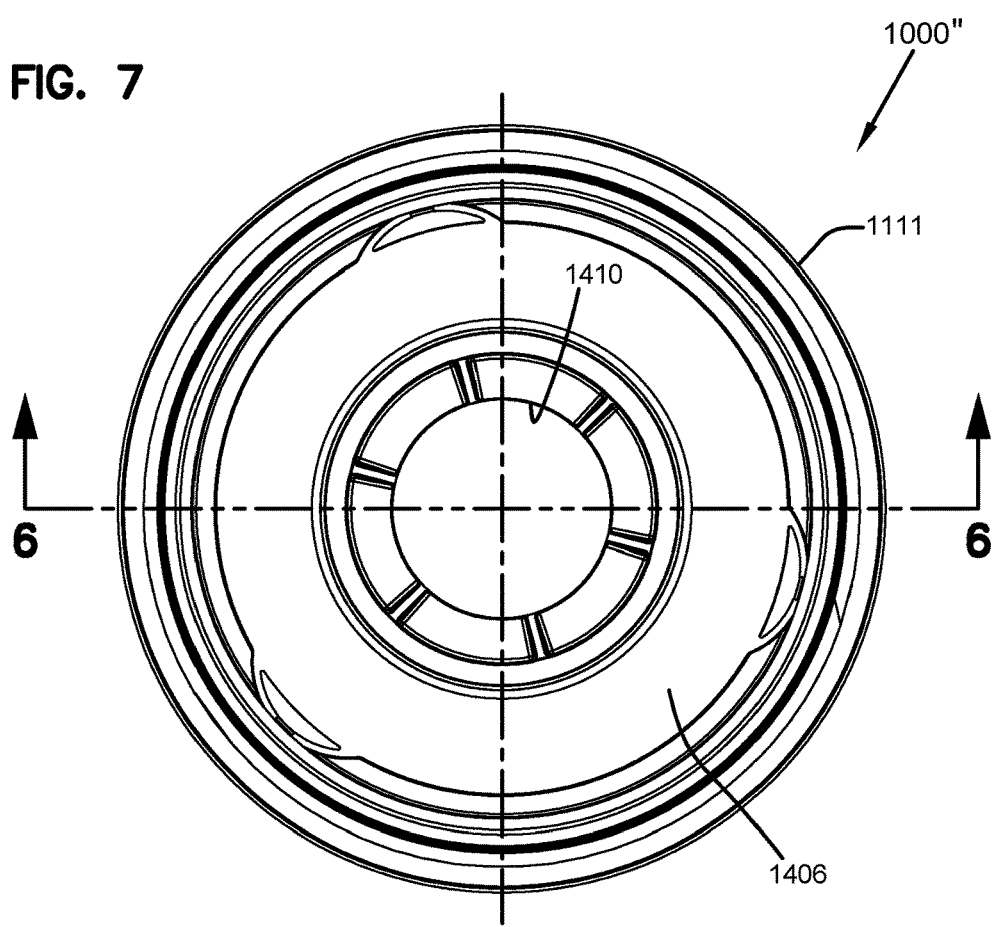
Figure 8:
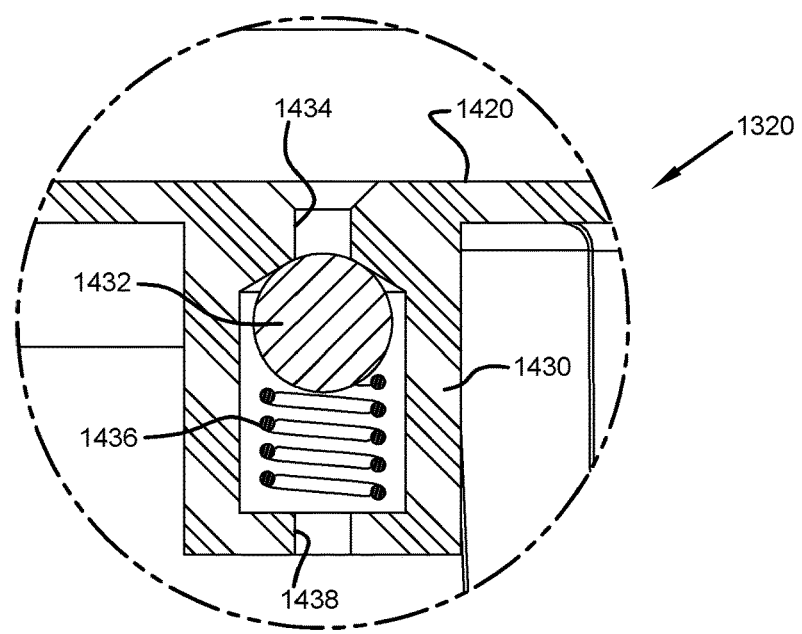
Figure 9:
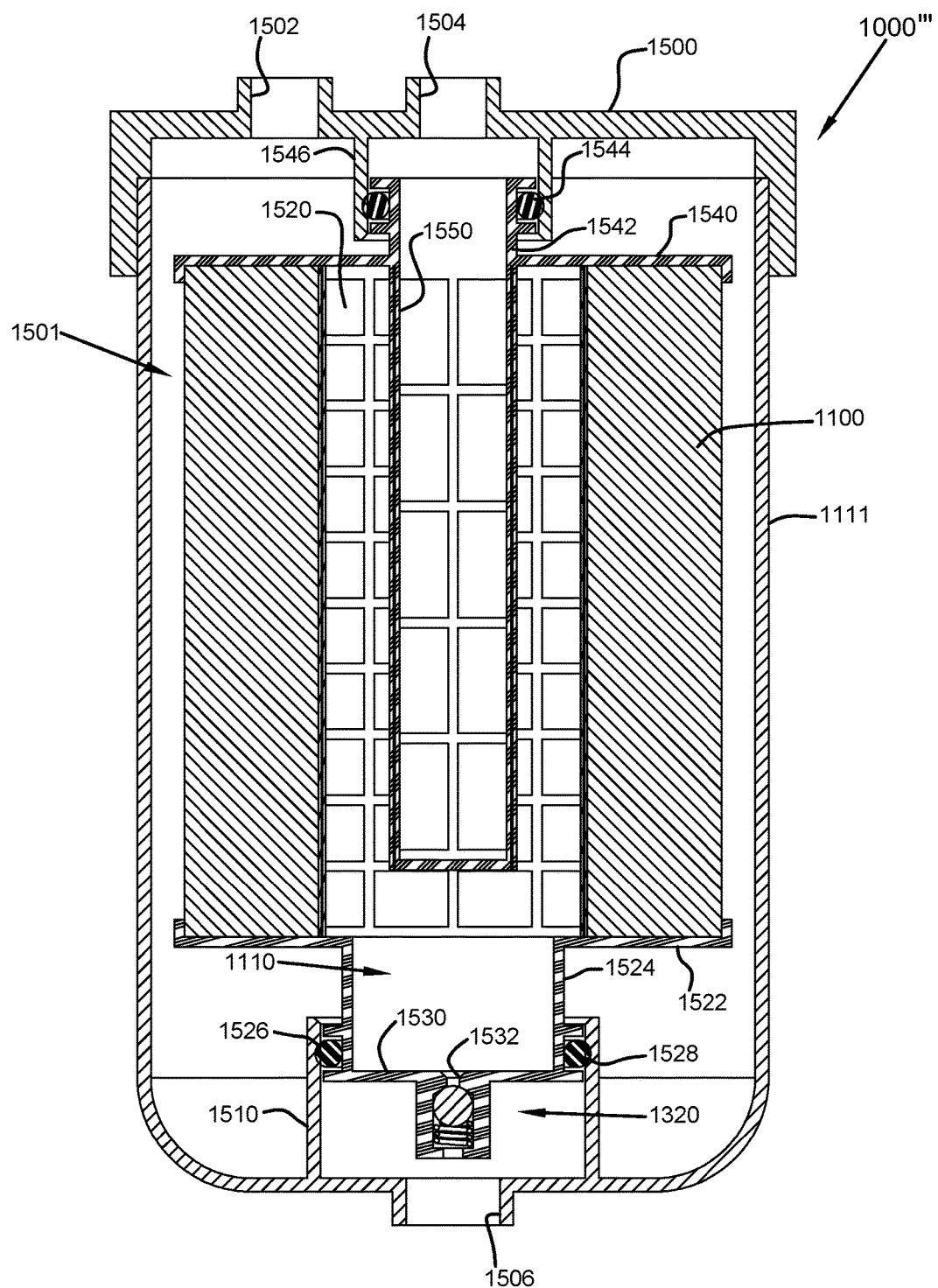
Figure 10:
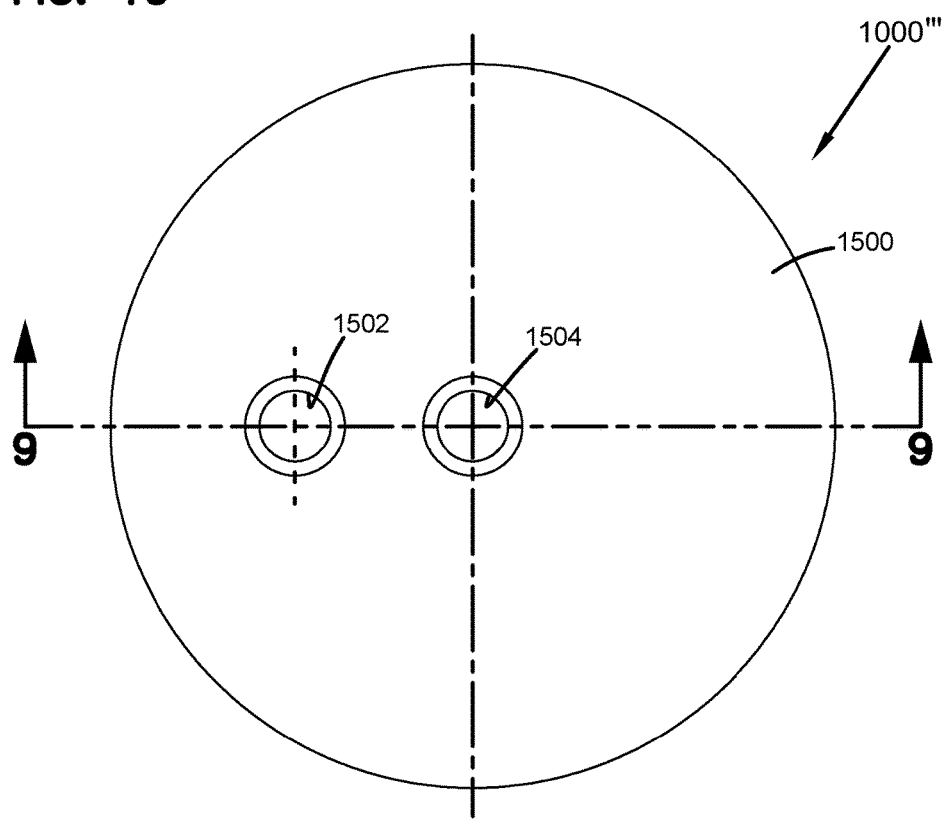
Figure 11:
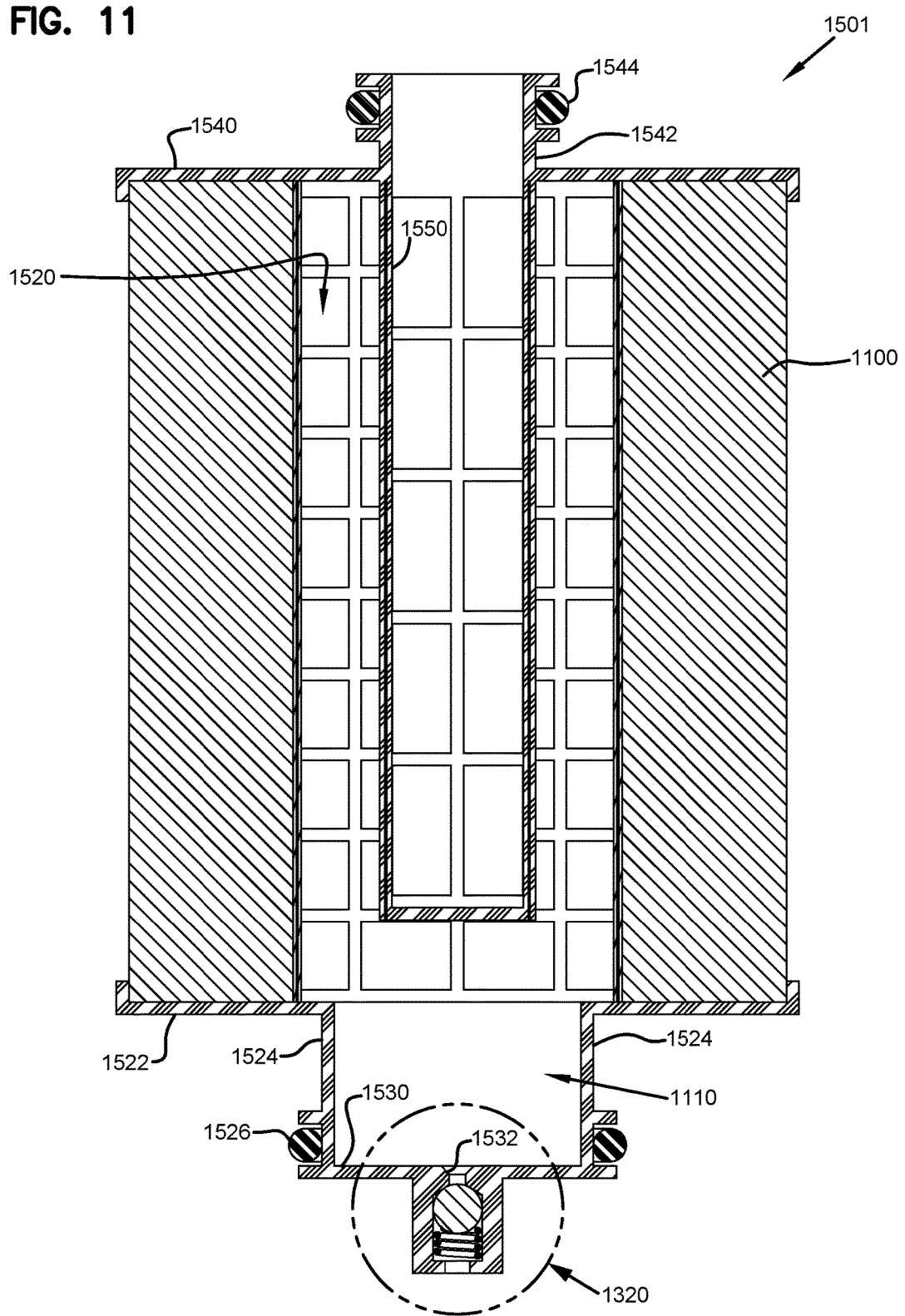
Figure 12:
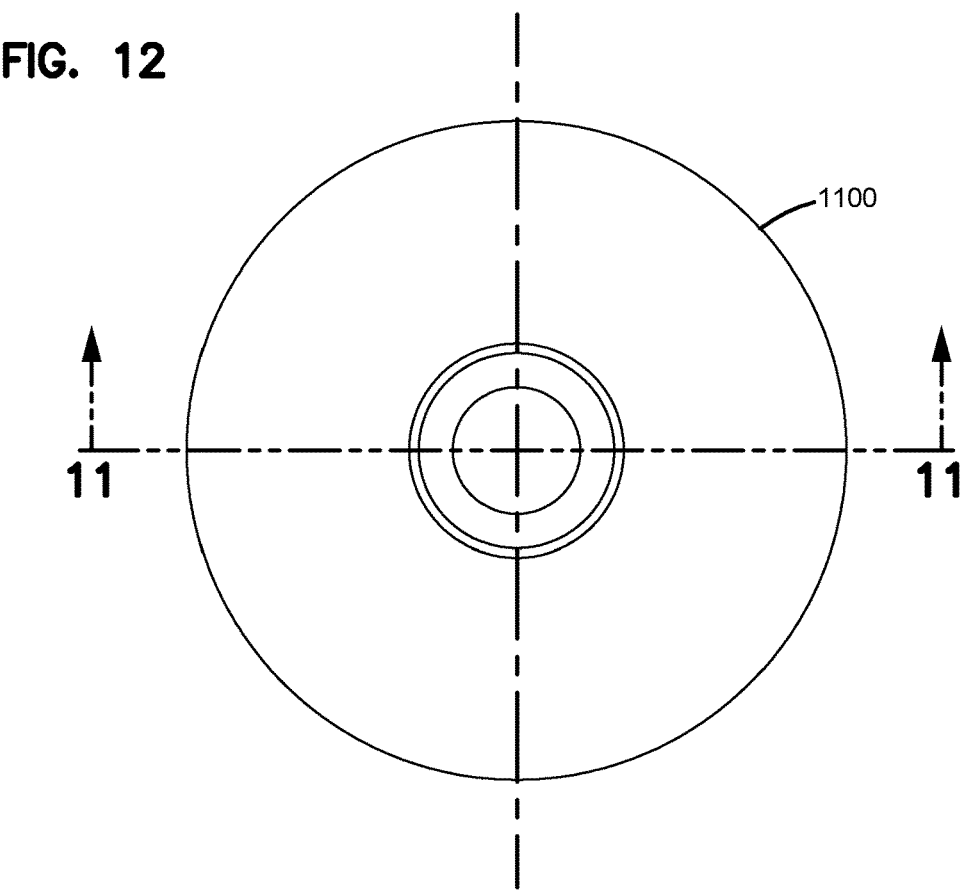

FIG. 1: shows a first example of a preferred embodiment of a fuel filter assembly in a fuel system of a combustion engine;

FIG. 2: shows a second example of a preferred embodiment of a fuel filter assembly in a fuel system of a combustion engine;

FIG. 3: shows a third example of a preferred embodiment of a fuel filter assembly in a fuel system of a combustion engine;

FIG. 4: shows a first example of a preferred replacement filter element for a fuel filter assembly;

FIG. 5: shows a second example of a preferred replacement filter element for a fuel filter assembly;

FIG. 6: shows a third example in cross-section of a preferred replacement filter element for a fuel filter assembly; the cross-section being taken along line 6-6 of FIG. 7;

FIG. 7: shows a top view of the filter element of FIG. 6;

FIG. 8: shows an enlarged view of the one-way valve in FIG. 6;

FIG. 9: shows a fourth example in cross-section of a preferred replacement filter element for a fuel filter assembly; the cross-section being taken along line 9-9 of FIG. 10;

FIG. 10: shows a top view of the filter element of FIG. 9;

FIG. 11: shows a cross-sectional view of the filter media construction used in the filter element of FIG. 9; the cross-section being taken along line 11-11 of FIG. 12;

FIG. 12: shows a top view of the filter media construction of FIG. 11; and

Figure 13:
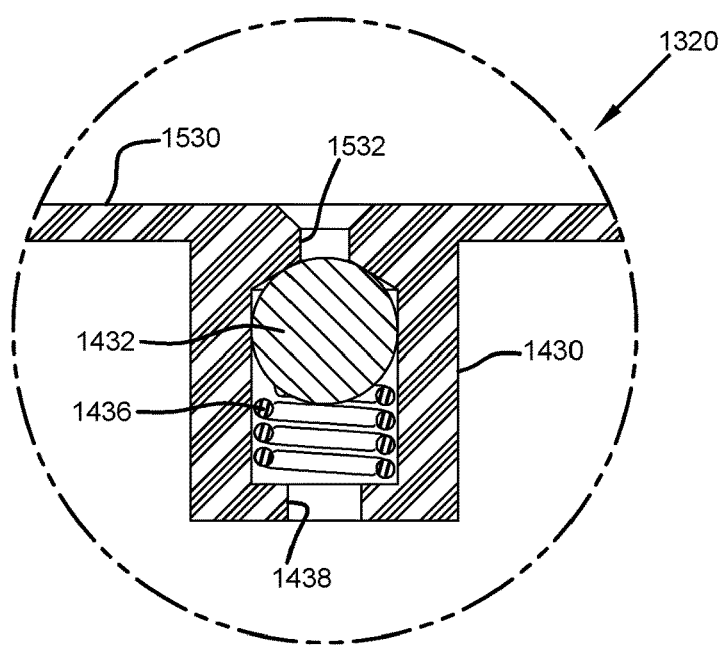

FIG. 13: shows an enlarged view of the one-way valve in FIG. 11.

FIGS. 1-3 show a fuel system 1, 1', 1" with fuel filter assembly 100, 100', 100" here a primary filter assembly, and a secondary filter assembly 200 downstream from the primary filter assembly 100, 100', 100". A fuel line 10 connects a fuel tank 101 via the primary filter assembly 100, 100', 100" via the secondary filter assembly 200 to a high pressure pump 500, a rail assembly 600, cylinder head injectors 700 and a fuel cooler 800. Part of the fuel system 1, 1', 1" are further a pressure sensor 300 and a temperature sensor 400. A bypass 11 in the fuel pipe 10 in the form of an air bleed bridges the primary filter assembly 100, 100', 100". The secondary filter element 200 comprises a secondary filter element 201. Apart from some differences in the primary filter assembly 100, 100', 100", the example embodiments shown in FIGS. 1 to 3 are equal.

The common elements of fuel filter assembly 100, 100', 100" shown in FIGS. 1-3 are now described in more detail. The fuel filter assembly 100, 100', 100" comprises a primary filter element 110 with a water collecting space 111. The filter element 110 is connected to the fuel pipe 10 for feeding an upstream side of the filter element 100 with fuel from fuel tank 101 and providing filter fuel from a downstream side of the filter element 110 to the secondary filter assembly 200.

The fuel filter assembly 100, 100', 100" shown in FIGS. 1-3 further comprises an electric volumetric fuel pump 120 downstream from filter element 110. The fuel pump 120 can be operated in a first mode for drawing fuel through the filter element 110 (indicated with the right arrow in fuel pump 120) and in a second, reverse mode for feeding fuel back to the filter element 110 (indicated with the left arrow in fuel pump 120). Bridging fuel pump 120 is a pressure regulator 12. Upstream of the filter element 110 a one-way fuel valve 131 is provided allowing for flow towards the upstream side of the filter element 110 but blocking in the reverse direction. In communication with the water collecting space 111 a pressure-actuated one-way drain valve, preferably a spring-loaded valve, is arranged in a drain pipe 20 allowing for drainage of water from the water collecting space 110 through the drain pipe 20 in case a pressure difference across the drain valve 132 exceeds a predetermined value.

The embodiments of the fuel filter assembly 100, 100" shown in FIGS. 1 and 3 further comprise a water level sensor 141. The embodiment of the fuel filter assembly 100 shown in FIG. 1 further comprises an additional, optional bypass 11a in the fuel pipe 10 in the form of an air bleed bridging the filter element 110.

A basic operating principle of the fuel filter assembly 100 depicted in FIG. 1 is as follows. After the combustion engine is shut down, and in case the water level sensor 141 detects that enough water for drainage is present in the water collecting space 111, fuel pump 120 is operated in the second, reverse mode. Since fuel valve 131 is stopped in this direction, pressure in the water collecting space 111 builds up and when it reaches the cracking pressure of drain valve 132 opens the drain valve 132 and water from the water collecting space 111 is discharged out of a water drain outlet and through drain pipe 20. The operation of the fuel pump in the second, reverse mode is stopped either after a predetermined amount of time (e.g., 5, 10, or 15 seconds, corresponding to a predetermined drain volume) or by a signal from the water level sensor 141 indicating that the water fill level in the water collecting space 111 has fallen below a minimum level.

The fuel filter assembly 100' depicted in FIG. 2 differs from the fuel filter assembly 100 depicted in FIG. 1 in particular in that no water level sensor is required in the example embodiment shown in FIG. 2. The reason is that the drain pipe 20 according to the embodiment shown in FIG. 2 is adapted and arranged to drain water to a separate volume 102 in fuel tank 101. In this way, also fuel can be discharged from the water collecting space 111 through drain pipe 20 and drain valve 132 to the separate volume 102 in fuel tank 101. Fuel pump 120 therefore can be operated in the second, reverse mode on a regular basis independent from the water fill level in water collecting space 111. Apart from these differences, the embodiment in FIG. 2 basically corresponds to the embodiment shown in FIG. 1. Therefore, reference is made to the description of the embodiment shown in FIG. 1 for the remaining features of the embodiment shown in FIG. 2.

This embodiment of FIG. 2 has the advantage of very low costs and the possibility to drain liquid from the water collecting space 111 due to the pressure in drain line 20 also to a separate volume 102 of a fuel tank 101 located at a higher level than the water collecting space 111. The separate volume 102 in fuel tank 101 may be provided with a divider wall allowing for fuel overflow to the fuel tank 101. However, cleaning of the fuel tank 101 and in particular of the separate volume 102 of the fuel tank 101 may be required at service interval to avoid the accumulation of water in the fuel tank.

Also the embodiment in FIG. 3 largely corresponds to the embodiment shown in FIG. 1 and for the corresponding features and advantageous reference is made to the embodiment in FIG. 1. The main differences of the embodiment shown in FIG. 3 over the embodiment shown in FIG. 1 are described in the following. In addition to the features of the embodiment shown in FIG. 1, the fuel filter assembly 100" of embodiment shown in FIG. 3 features a water purification space 150 contained in a water purification chamber. The purification space 150 contains activated carbon as a hydrocarbon remover 151. The water purification space 150 is connected to the water collection space 111 via drain pipe 20 with the drain valve 132 arranged between the water collection space 111 and the water purification space 150. In communication with water purification space 150 is a further pressure-activated one-way valve, namely a discharge valve 133. Preferably, also the pressure-actuated one-way discharge valve 133 is a spring-loaded valve. Further, a sensor 142 is connected to water purification space 150. Sensor 142 may be a fuel sensor, an optical sensor and/or a pressure sensor. A fuel and/or optical sensor may be used to determine the presence of fuel or other impurities in water purification space 150. A pressure sensor may be used for determining any malfunction resulting in an unduly high pressure within water purification space 150. The embodiment shown in FIG. 3 has the advantage that the water discharged from water collection space 111 is purified in water purification space 150 by removing hydrocarbon such that water discharged from the water purification space 150 via the discharge valve 133 may be safely discharged to the environment or other systems.

In the embodiments of FIGS. 1-3, a control unit 900 connects to one or more of the sensors (e.g., pressure sensor 300, temperature sensor 400, water level sensor 141) and/or to the fuel pump 120. The control unit 900 is adapted and arranged to generate a signal depending on one or more signals from one or more of the sensors 300, 400, 141 and/or to start and/or stop the fuel pump 120 to operate in the second, reverse mode depending on one or more signals from one or more of the sensors 300, 400, 141.

Example embodiments of preferred replacement filter elements are shown in FIGS. 4-13. The embodiments shown in FIGS. 4 and 5 differ in that FIG. 5 additionally comprises a water purification space 1150 with activated carbon 1151 and a pressure-activated one-way discharge valve 1133, here a spring-loaded valve, which are not present in the embodiment of FIG. 4. The water purification space 1150 is contained in a water purification chamber in FIG. 5. The water purification space 1150 with the hydrocarbon remover 1151 may be part of the replacement filter cartridge 1000' as shown in the embodiment of FIG. 5 or may be provided as a separate replacement part which is preferably directly attached to the replacement filter element.

The description of the further elements of the replacement filter elements 1000, 1000', 1000", 1000''' applies to FIGS. 4, 5, 6, and 9. The replacement filter elements 1000, 1000', 1000", 1000''' shown in FIGS. 4, 5, 6, and 9 comprise a housing or bowl 1111 and filter means or filter media 1100 for separating water from fuel and possibly further filtering particles from fuel. Filter media 1100 are cylindrical filter media constructions with open filter interiors in the embodiments shown in FIGS. 4, 5, 6 and 9. Below filter media 1100, a water collection space 1110 is present for collecting water separated from fuel.

In direct and free-flowing communication with water collection space 1110 is a spring-loaded valve 1320 functioning as the pressure-actuated one-way drain valve allowing for drainage of water from the water collection space 1110 out of a water drain outlet 1113. The one-way drain valve is closed and opens only when a cracking pressure in the water collection space 1110 is reached. Example cracking pressures include between 3 bar and 6 bar.

For example, the pressure for the one-way valve 1320 is activated through pressure build up by the compression of the fluid in the water collecting space 1110, resulting from a back flow returning from the fuel outlet port when the fuel pump 120 is in reverse mode. The pressure is typically not supplied by a pump positioned in the tank.

In water collection space 1110 a water level sensor 1300 is present for detecting whether water accumulated in the water collection space 1110 exceeds a predetermined level. Housing 1111 of replacement filter element 1000, 1000', 1000", 1000''' has a threaded opening 1112 and the bottom, which is closed by a manual drainage valve 1200 with a corresponding thread 1212 on a central projection 1211. Due to the presence of the water purification space 1150 the central projection 1211 is larger in the embodiment of FIG. 5. The manual drainage valve 1200 seals the threaded opening 1112 in housing 1111 in its closed position via sealing element 1220. When the manual drainage valve 1200 is turned into its open position depicted in FIGS. 4 and 5, water from the water collection space 1110 is discharged via gravity through space 1213 and through openings 1210 of manual drainage valve 1200. The manual draining is required to empty the water collecting space 1110 prior to replacing the filter cartridge to avoid spilling of fuel. The manual drainage valve 1200 is not shown in the example of FIG. 9, but it can be part of that example.

Preferably, the manual drainage valve 1200 with the water level sensor 1300 is removably attached to the filter element and can be reused while the filter element is discharged. In this way, costly elements like sensors can be reduced while the replacement filter elements with the cheap pressure-actuated one-way drain valve and possibly a water purification space 1150 with a hydrocarbon remover 1151 and a pressure-actuated one-way discharge valve 1133 can be manufactured cheaply and can be discharged.

Additional features of element 1000" of FIG. 6 include the filter media 1100 being part of filter media construction 1401 that is removable and replaceable within the housing 1111.

The housing 1100 in FIG. 6 includes a threaded sleeve 1400 secured to an outside of the housing 1111 adjacent to an open mouth 1402. The filter media construction 1401 can be removed and replaced through the mouth 1402. The sleeve 1400 holds a seal member 1404, which is oriented to form a radial seal between and against the sleeve 1400 and a filter head, when the element 1000' is secured to a filter head.

Still in reference to element 1000" of FIG. 6, the filter media construction 1401 includes an upper end cap 1406 and a bottom end cap 1408 secured thereto. The upper end cap 1406 has an opening 1410 to allow filtered fluid to exit. The bottom end cap 1408 is closed. The upper end cap 1406 holds a seal member 1412 to form a seal with a portion of a filter head, when the element 1000' is secured to a filter head.

Still in reference to element 1000" of FIG. 6, a plate 1420 is sealed within the interior of the housing 1111 by a radial seal member 1422. The plate 1420 holds the one-way valve 1320, away from the filter media 1100, with the water collection space 1110 therebetween.

FIG. 8 shows an enlarged view of the one-way valve 1320 from FIG. 6. The one-way valve 1320 has a valve housing 1430 holding a ball 1432 biased against a valve opening 1434 by a spring 1436. The one-way drain valve 1320 is closed and opens only when a cracking pressure in the water collection space 1110 is reached, which will move the ball 1432 against the spring 1436 to expose the opening 1434. This allows the water to flow through the opening 1434 and then out through an exit aperture 1438. Example cracking pressures include between 3 bar and 6 bar. The pressure for the one-way valve 1320 is activated through pressure build up by the compression of the fluid in the water collecting space 1110.

Additional features of element 1000''' of FIG. 9 include the housing 1111 having an end plate 1500 secured thereto. The end plate 1500 has an inlet port 1502 and an outlet port 1504. There is an opening 1506 at a bottom of the housing 1111, which can include manual drainage valve 1200, depicted in other examples of the housing 1111. An inner upstanding wall 1510 extends upward from an inside of the bottom of the housing 1111. It forms a surface to seal the filter 1100 thereto.

In FIGS. 9 and 11, the filter media 1100 is part of filter media construction 1501 has an open interior volume 1520 and includes a bottom end cap 1522 secured thereto. The bottom end cap 1522 includes an axially spaced wall 1524 surrounding the water collection space 1110. The axially spaced cylindrical wall 1524 is under the open interior volume 1520 and outside of the filter media 1100. The axially spaced cylindrical wall 1524 extends or projects axially away from the filter media 1100.

The wall 1524 holds a seal member 1526, which forms a seal with an inner surface 1528 of the upstanding wall 1510. Closing the bottom of the cylindrical wall 1524 is a plate 1530 holding the one-way valve 1320. The plate 1530 has an opening 1532 in direct and open communication with the water collection space 1110. The one way valve 1320, shown enlarged in FIG. 13, is the same as FIG. 8 and therefore has the same reference numerals.

Still in reference to FIGS. 9 and 11, the filter media construction 1501 has an upper end cap 1540 secured to the filter media 1100. Extending axially away from the filter media 1100 and projecting from the upper end cap 1540 is a neck 1542 holding a seal member 1544. The seal member 1544 forms a radial seal with a downward projecting cylindrical wall 1546 extending from an inside of the end plate 1500. The wall 1546 surrounds the outlet port 1504.

Still in reference to FIGS. 9 and 11, a filter screen 1550 is in the open interior volume 1520 of the filter media construction 1501. The filter screen 1550 can be in the form of a cylinder. The screen 1550 can be a mesh screen that is water repellant to avoid re-entrainment of water droplets to the clean side of the filter media 1100. Filtered fluid is required to flow through the filter screen 1550 before it can exit the filter element 1000''' by flowing through the neck 1546 and then through the outlet port 1504.

The invention claimed is:

1. A fuel filter assembly, comprising:
   a filter element with a water collecting space and a water drain outlet;
   the filter element being connected to a fuel pipe for feeding an upstream side of the filter element with fuel and for providing filtered fuel from a downstream side of the filter element; and
   a fuel pump arranged downstream from the filter element, wherein the fuel pump can be operated in a first mode for drawing fuel through the filter element and in a second, reverse mode for feeding fuel back to the filter element.

2. A fuel filter assembly according to claim 1, further comprising a manual drainage valve in communication with the water collecting space.

3. A fuel filter assembly according to claim 1, further comprising a water purification space with a hydrocarbon remover.

4. A fuel filter assembly according to claim 1, further comprising a pressure-actuated one-way discharge valve in communication with the water purification space.

5. A fuel filter assembly according to claim 1, further comprising a water level sensor for detecting whether water accumulated in the water collecting space exceeds a predetermined level, wherein the water level sensor is connected to the fuel pump such that the fuel pump can be started and/or stopped to operate in the second, reverse mode depending on a signal from the water level sensor.

6. A fuel filter assembly according to claim 1, further comprising:
   a pressure sensor adapted and arranged to determine the pressure in the water purification space and/or to determine whether the pressure in the water purification space exceeds a predetermined value, and/or
   a temperature sensor adapted and arranged to determine a temperature and/or to determine whether the determined temperature is below a predetermined value.

7. A fuel filter assembly according to claim 1, further comprising a fuel sensor and/or an optical sensor adapted and arranged to determine the presence and/or an amount of fuel and/or other impurities in the water accumulated in the water purification space and/or to determine whether an amount of fuel and/or other impurities in the water accumulated in the water purification space exceeds a predetermined value.

8. A fuel filter assembly according to claim 1, further comprising a control unit connected to one or more of the sensors and/or to the fuel pump, wherein the control unit is adapted and arranged to generate a signal depending on one or more signals from one or more of the sensors and/or to start and/or stop the fuel pump to operate in the second, reverse mode depending on one or more signals from one or more of the sensors.

9. A fuel filter assembly according to claim 1 further comprising:
   a valve allowing for flow towards the upstream side of the filter element.

10. A fuel filter assembly according to claim 9, wherein:
the valve comprises a one-way fuel valve arranged upstream of the filter element allowing for flow towards the upstream side of the filter element.

11. A fuel filter assembly according to claim 1, further comprising:
a valve in communication with the water collecting space and the water drain outlet.

12. A fuel filter assembly according to claim 11, wherein:
the valve in communication with the water collecting space and the water drain outlet comprises a pressure-actuated one-way drain valve in communication with the water collecting space and the water drain outlet.

13. A filter element, comprising:
filter media construction with filter media for separating water from fuel;
a water collecting space and a water drain outlet; and
a pressure-actuated one-way drain valve in communication with the water collecting space and the water drain outlet;
the one-way drain valve being in direct and free-flowing communication with the water collecting space; and
the one-way drain valve being closed and opening only when a cracking pressure in the water collecting space is reached.

14. A filter element according to claim 13, wherein:
the filter media construction has an open interior volume and includes a bottom end cap secured thereto; the bottom end cap includes an axially spaced wall surrounding the water collection space, the axially spaced wall being under the open interior volume and outside of the filter media.

15. A filter element according to claim 13, including:
a filter screen in an open interior volume of the filter media construction.

16. A filter element according to claim 13, further including a housing, the filter media construction being in the housing.

17. A filter element according to claim 16, further comprising a manual drainage valve in communication with the water collecting space.

18. A filter element according to claim 16, further comprising a water purification space with a hydrocarbon remover and further comprising a pressure-actuated one-way discharge valve in communication with the water purification space.

19. A filter element according to claim 16, further comprising a water level sensor for detecting whether water accumulated in the water collecting space exceeds a predetermined level.

20. A filter element according to claim 16, further comprising
a pressure sensor adapted and arranged to determine the pressure in the water purification space and/or to determine whether the pressure in the water purification space exceeds a predetermined value, and/or
a temperature sensor adapted and arranged to determine a temperature and/or to determine whether the determined temperature is below a predetermined value.

21. A filter element according to claim 16, further comprising a fuel sensor and/or an optical sensor adapted and arranged to determine the presence and/or an amount of fuel and/or other impurities in the water of the water purification space and/or to determine whether an amount of fuel and/or other impurities in the water of the water purification space exceeds a predetermined value.

22. A method for draining water from a fuel filter assembly, comprising the steps:
providing a fuel filter assembly according to claim 1;
operating the fuel pump in the second, reverse mode, thereby raising pressure in the filter element and/or the water collecting space and opening the drain valve once the pressure in the filter element and/or the water collecting space exceeds a predetermined value.

* * * * *